United States Patent [19]

Aydin et al.

[11] Patent Number: 4,609,420

[45] Date of Patent: Sep. 2, 1986

[54] ADHESION OF LAYERS OF ADHESIVE WHICH ARE APPLIED ONTO POLYOLEFIN SURFACES FROM AQUEOUS DISPERSION

[75] Inventors: Oral Aydin; Hans Kast, both of Mannheim; Hans-Joachim Fricke, Dirmstein, all of Fed. Rep. of Germany

[73] Assignee: BASF Aktiengesellschaft, Rheinland-Pfalz, Fed. Rep. of Germany

[21] Appl. No.: 677,505

[22] Filed: Dec. 3, 1984

[30] Foreign Application Priority Data

Dec. 3, 1983 [DE] Fed. Rep. of Germany ....... 3343779

[51] Int. Cl.$^4$ .............................................. B32B 31/00
[52] U.S. Cl. .............................. 156/272.6; 106/287.25;
156/273.3; 156/275.7; 156/314; 156/327;
428/523; 524/543; 564/148
[58] Field of Search .................... 156/314, 327, 272.6,
156/273.3, 275.7; 524/543; 106/287.25;
428/523; 564/148

[56] References Cited

U.S. PATENT DOCUMENTS

| | | | |
|---|---|---|---|
| 3,914,521 | 10/1975 | Beatty et al. | 156/272.6 |
| 4,092,202 | 5/1978 | Bergk et al. | 156/324 |
| 4,436,570 | 3/1984 | Neuhaus et al. | 156/273.3 |
| 4,464,220 | 8/1984 | Beer | 156/275.7 |

OTHER PUBLICATIONS

Chemical Abstracts, vol. 87 (1977), p. 34, No. 85737q—Columbus, Ohio, US & JP-A-76-50937.
Chemical Abstracts, vol. 90, (1979), p. 44, No. 73026f, Columbus, Ohio US & JP-A-78-123 441.

*Primary Examiner*—John J. Gallagher
*Attorney, Agent, or Firm*—Oblon, Fisher, Spivak, McClelland & Maier

[57] ABSTRACT

Layers of adhesives which are applied onto polyolefin surfaces from aqueous dispersion exhibit improved adhesion if a dicarboxylic acid dihydrazide of 2 to 10 carbon atoms and an aqueous dispersion of an adhesive polymer are applied, preferably as a mixture, onto the polyolefin surfaces which have been pretreated by corona discharge.

10 Claims, No Drawings

ADHESION OF LAYERS OF ADHESIVE WHICH ARE APPLIED ONTO POLYOLEFIN SURFACES FROM AQUEOUS DISPERSION

The present invention relates to the improvement of the adhesion of layers of adhesive which are applied, from an aqueous dispersion, onto polyolefin surfaces which are to be adhesively bonded to similar or different substrates.

For adhesively bonding films of various types, adhesives dissolved in organic solvents are generally employed in practice. The disadvantages of this procedure are the relatively high solvent costs, the need to clean the waste air, possible subsequent combustion of small residual amounts of solvent and/or the solvent emissions. Attempts have therefore been made to dispense with a solvent: according to U.S. Pat. No. 4,092,202, urethanes which possess terminal isocyanate groups, can be processed at about 100° C. and cure under the action of atmospheric moisture to form an adhesive bond have been employed. However, the disadvantages of this procedure are that the stability of the reactive system is much too low and that the laminates do not possess sufficient initial adhesion.

Furthermore, U.S. Pat. No. 4,436,570 discloses solvent-free adhesives for bonding films, which cure under the action of high-energy radiation, eg. UV radiation or electron beams. These are two-component systems which contain (A) one or more polyisocyanates and (B) one or more compounds possessing (meth)acryloyl groups and hydroxyl groups. In practice, however, systems of this type exhibit poor initial adhesion directly after the lamination procedure, and their behavior during processing is difficult to control.

In general, polyolefins give rise to a particular difficulty in that adhesives adhere particularly poorly to their surface in comparison with surfaces of other materials, this applying to blown hollow articles, to films and to injection-molded articles. Attempts have therefore been made to improve the adhesion to polyolefin surfaces by treatment of these surfaces with hot air, flame treatment, UV irradiation, treatment with ozone or chlorine, oxidation with nitric acid or chromosulfuric acid or in particular by corona discharge, or to use primers, such as silane compounds, titanates, polyethyleneimines or special melamine/formaldehyde condensates to achieve better adhesion.

The most important industrial method at present is corona discharge which is particularly simple and not especially complicated technically. However, disadvantages of this method are the relatively rapid decrease in activity after the treatment and the adverse effect of processing assistants, eg. lubricants, which reduce the effect of the corona treatment. Although corona pretreatment of olefin surfaces can result in a substantial improvement in the adhesion, which has a pronounced effect, for example, during coating with adhesive solutions in organic solvents or during printing of the surfaces, this improvement is not sufficient to achieve adequate adhesion of adhesive films applied from aqueous dispersion.

It is an object of the present invention to provide polyolefin surfaces with adhesives from aqueous dispersion in such a way that their adhesion meets the practical requirements.

We have found that this object is achieved, and that the adhesion of layers of adhesive which are applied onto polyolefin surfaces from aqueous dispersion can be greatly improved, if a dicarboxylic acid dihydrazide of 2 to 10 carbon atoms and an aqueous dispersion of an adhesive polymer are applied, preferably as a mixture, onto the polyolefin surface which has been pretreated in a conventional manner by corona discharge. Particularly suitable dihydrazides for this purpose are oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, itaconic acid dihydrazide and/or isophthalic acid dihydrazide. Adipic acid dihydrazide, sebacic acid dihydrazide and isophthalic acid dihydrazide are particularly important.

The dihydrazides of the stated type are preferably applied to the polyolefin surfaces, which have been pretreated by corona discharge, in the form of a mixture with the aqueous dispersions of the adhesive polymers, the amount of the dihydrazides being from 0.01 to 4, preferably from 0.1 to 2, % by weight, based on the polymer content of the dispersions. However, it is also possible to apply the dihydrazides as such, if necessary in the form of their solutions, for example in water or a lower alcohol, onto the polyolefin surfaces pretreated by corona discharge, from 0.001 to 1, preferably from 0.002 to 0.05, g per m$^2$ of polyolefin surface being sufficient. Where the dihydrazides are applied to the polyolefin surface, this should be carried out as far as possible directly after the corona discharge treatment. The films pretreated in this manner have a longer shelf life and better adhesion than films pretreated exclusively by corona discharge.

For the purposes of the present invention, polyolefins are, in particular, the ethylene and propylene polymers prepared by conventional high pressure and low pressure polymerization processes and as are used in particular for the production of films. Aqueous dispersions of adhesive polymers are well known and are readily available commercially. Suitable dispersions are in general aqueous dispersions of polymers whose glass transition temperatures are in many cases below 50° C., preferably below 25° C. Particular examples are the adhesive dispersions which are prepared in a conventional manner and are based on acrylates and methacrylates, in general ethyl, butyl and/or 2-ethylhexyl acrylate, and aqueous dispersions of butadiene/styrene copolymers, of vinyl ester polymers and of vinyl halide polymers, in particular vinyl chloride copolymers. Adhesive copolymers of this type can furthermore contain, as comonomers, minor amounts of acrylonitrile and/or α,β-monoolefinically unsaturated mono- and/or dicarboxylic acids of 3 to 5 carbon atoms and/or their amides and their derivatives which are substituted at the amide nitrogen atoms by methylol groups, or copolymerizable olefinically unsaturated ketones or aldehydes, eg. acrylic acid, methacrylic acid, itaconic acid, acrylamide, methacrylamide, N-methylolacrylamide, N-methylolmethacrylamide, N-butoxymethylacrylamide, N-methylacrylamide, acrolein and diacetoneacrylamide. In some cases, such copolymers also contain, as copolymerized units, vinylsulfonic acid or other olefinically unsaturated acids, eg. N-(β-sulfatoethyl)-acrylamide, β-sulfoethyl methacrylate or acrylamidopropanesulfonic acid. The amount of such monomers possessing reactive radicals is in general from 0.5 to 5, in particular from 1 to 3, % by weight, based on the total amount of monomers. Aqueous dispersions of polyurethane adhesives are also suitable. The polymer content of the dispersion is in general from 40 to 60 percent by weight.

Examples of suitable aqueous dispersions of polyacrylate adhesives are disclosed in, for example, British Pat. Nos. 1,259,459 and 1,521,716, U.S. Pat. Nos. 3,008,850 and 2,956,904 and European Laid-Open Application Nos. 84,132 and 88,300. A suitable aqueous dispersion of an adhesive copolymer based on a butadiene/styrene copolymer is described in, for example, European Laid-Open Application No. 50,226. Examples of useful aqueous dispersions of adhesive copolymers based on polyvinyl esters are disclosed in I. Skeist, Handbook of Adhesives, 2nd edition, Nostrand Reinhold Company, New York 1977, pages 464–495, and dispersions based on polyurethane adhesives are disclosed in U.S. Pat. No. 3,479,310.

The polyolefin, eg. polyethylene, surfaces coated with the dicarboxylic acid dihydrazides and with the aqueous dispersions of adhesive polymers can be laminated with other substrates, eg. uncoated films based on polyolefins, nylons, polyesters, polystyrene or polyvinyl halides, in particular polyvinyl chloride, or can be adhesively bonded to other sheet-like substrates, for example those consisting of wood, metals or plastics. This procedure provides adhesion as can otherwise be achieved only by applying the adhesive polymers from non-aqueous systems.

In the Examples which follow, parts and percentages are by weight.

EXAMPLE 1

Various amounts of a 50% strength aqueous dispersion of adipic acid dihydrazide are added to a 50% strength aqueous dispersion, prepared in a conventional manner, of a copolymer of 85 parts of 2-ethylhexyl acrylate, 10 parts of acrylonitrile, 2.5 parts of acrylic acid and 2.5 parts of N-methylolmethacrylamide. The resulting mixtures are applied, in an amount of 10 g/m$^2$, onto a 150 μm thick polyethylene film which has been pretreated in a conventional manner by corona discharge. Drying is carried out at room temperature, and in each case lamination with a polypropylene film and a nylon film is carried out by means of a rubber roller. The laminates obtained are heated at 60° C. for 3 minutes in a drying oven, after which they are cut into 2 cm wide strips. The bonding strengths of these strips are then determined using a tensile test apparatus; these strengths are summarized in Table 1 below, which also shows the amount of adipic acid dihydrazide in percent, based on the polymer content of the dispersion. The Table also includes a comparative experiment in which an aqueous dispersion of the copolymer without added dihydrazide was applied onto the polyethylene film pretreated by corona discharge.

In the Table below, PE is polyethylene, PP is polypropylene and PA is nylon.

TABLE 1

| | Bonding strengths in N/cm | | | | |
|---|---|---|---|---|---|
| | Adipic acid dihydrazide in % by weight | | | | |
| | zero | 0.1 | 0.5 | 2 | 4 |
| PE/PP | 0.2 | 0.8 | 1.6 | 1.2 | 1.3 |
| PE/PA | 0.2 | 0.6 | 1.1 | 0.8 | 0.9 |

EXAMPLE 2

A 50% strength aqueous suspension of adipic acid dihydrazide is added to a 55% strength aqueous dispersion of a copolymer, prepared in a conventional manner, of 40% by weight of n-butyl acrylate, 20% by weight of vinyl propionate and 40% by weight of vinylidene chloride, so that the resulting dispersion contains 1%, based on the amount of polymer, of this hydrazide. The dispersion is applied, in an amount of 10 g/m$^2$, onto a polyethylene film pretreated in a conventional manner with a corona discharge. Furthermore, a polyethylene film of this type is first coated with a 1% strength aqueous solution of adipic acid dihydrazide in an amount corresponding to 0.5 g/m$^2$ of the dihydrazide, the said aqueous solution containing, in order to improve the wetting of the polyethylene film, 0.2% by weight of the sodium salt of the half-ester of sulfuric acid with isooctylphenol oxyethylated with 9 moles of ethylene oxide. The film primed in this manner is dried for 3 minutes at 60° C. and then coated with the dihydrazide-free polymer dispersion in an amount of 10 g/m$^2$. The coated films are dried for 3 minutes at 60° C.

Thereafter, crosswise incisions are made carefully on the coated sides of the films, using a razor blade (crosshatch). A 2 cm wide self-adhesive strip (Tesafilm) is then struck on, covering the crosshatch and about 10 cm of the coating. The Tesafilm strip is peeled off at an angle of 180° from the point of bonding with the crosshatch, this being done using a tensile test apparatus. The following bonding strengths, in N/2 cm, are obtained in this test:

TABLE 2

| no additive | with 1% of ADH | primed with ADH |
|---|---|---|
| 0.6 Ao | 4.6 A | 4.6 A |

EXAMPLE 3

(a) The procedure described in Example 2 is followed, except that a 50% strength aqueous dispersion, prepared in a conventional manner, of a copolymer of 48% by weight of n-butyl acrylate, 48% by weight of styrene, 2% by weight of acrylic acid and 2% by weight of methacrylamide is used. The following bonding strengths, in N/2 cm, are obtained in this case:

TABLE 3

| no additive | 1% of ADH | pretreated with ADH |
|---|---|---|
| 0.4 Ao | 3.3 A | 3.4 A |

For further 2 cm wide samples without any crosshatch, the Tesafilm is peeled off manually, and the adhesion to the polyethylene film is rated empirically. The rating is based on the following scale:
1 = very good adhesion
2 = good adhesion
3 = moderate adhesion
4 = moderate to poor adhesion
5 = no adhesion.
The following ratings are obtained:

TABLE 4

| no additive | 1% of ADH | pretreated with ADH |
|---|---|---|
| 5 | 3 | 1–2 |

(b) The empirical rating of the bonding strengths of Tesafilm to polyethylene films coated with the dispersion and the dihydrazide according to (a) is repeated using the same amounts of the following dihydrazides: (b1) succinic acid dihydrazide and (b2) isophthalic acid dihydrazide. The ratings obtained with these compounds are summarized in Table 5 below:

TABLE 5

|  | no additive | 1% of dihydrazide | pretreated with dihydrazide |
|---|---|---|---|
| b 1 | 5 | 3 | 2 |
| b 2 | 5 | 3 | 2-3 |

EXAMPLE 4

Example 2 is repeated, except that an aqueous dispersion, prepared in a conventional manner, of a copolymer of 30% by weight of butadiene, 66% by weight of styrene, 1% by weight of methacrylamide and 3% by weight of acrylic acid is used. The bonding strength in N/2 cm, obtained with this dispersion is summarized in Table 6 below:

TABLE 6

| no additive | 1% of ADH | pretreated with ADH |
|---|---|---|
| 1.2 Ao | 3.0 A | 3.1 A |

In all experiments,
Ao=coating is transferred to the Tesafilm
A=coating remains on the PE film

We claim:

1. A process for improving the adhesion of a layer of adhesive which is applied onto a polyolefin surface from aqueous dispersion comprising the steps of pretreating a polyolefin surface by corona discharge and applying a carboxylic acid dihydrazide of 2 to 10 carbon atoms and an aqueous dispersion of an adhesive polymer onto said polyolefin surface.

2. The process of claim 1 wherein a dicarboxylic acid dihydrazide of 2 to 10 carbon atoms and an aqueous dispersion of an adhesive polymer are applied as a mixture onto said polyolefin surface.

3. The process of claim 1, wherein a dicarboxylic acid dihydrazide of 2 to 10 carbon atoms, in the form of a mixture with an aqueous dispersion of an adhesive polymer, is applied onto a polyolefin surface pretreated by corona discharge in an amount ranging from 0.01 to 4 weight percentage based on the polymer content of the aqueous dispersion.

4. The process of claim 3, wherein said amount ranges from 0.1 to 2 weight percentage based on the polymer content of the aqueous dispersion.

5. The process of claim 1, wherein a dicarboxylic acid dihydrazide of 2 to 10 carbon atoms in its solution of water or a lower alcohol is applied onto a polyolefin surface pretreated by corona discharge, in an amount ranging from 0.001 to 1 g per $m^2$ of polyolefin surface.

6. The process of claim 5, wherein said amount ranges from 0.002 to 0.05 g per $m^2$ of polyolefin surface.

7. The process of claim 1, wherein the aqueous dispersion of an adhesive polymer has a glass transition temperature below 50° C.

8. The process of claim 1, wherein the aqueous dispersion of an adhesive polymer has a glass transition temperature below 25° C.

9. The process of claim 1, wherein the polymer content of an aqueous dispersion of an adhesive polymer ranges from 40 to 60 percent by weight.

10. The process of claim 1, wherein a dicarboxylic acid dihydrazide is selected from the group consisting of oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, itaconic acid dihydrazide and isophtalic acid dihydrazide.

* * * * *